United States Patent [19]

Goo

[11] Patent Number: 5,467,162
[45] Date of Patent: Nov. 14, 1995

[54] CAMERA WITH AUTO PHOTOGRAPHING MODE CONVERSION FUNCTION AND METHOD FOR CONTROLLING THE SAME

[75] Inventor: Bon-jeong Goo, Kyeongsangnam, Rep. of Korea

[73] Assignee: Samsung Aerospace Industries, Ltd., Kyeongsangnam, Rep. of Korea

[21] Appl. No.: 175,269

[22] Filed: Dec. 29, 1993

[30] Foreign Application Priority Data

Dec. 30, 1992 [KR] Rep. of Korea ............... 1992-26734

[51] Int. Cl.⁶ .................... G03B 3/00; G03B 13/18
[52] U.S. Cl. ............... 354/402; 354/195.1; 348/358
[58] Field of Search ............... 354/195.1, 195.12; 348/358

[56] References Cited

U.S. PATENT DOCUMENTS 5,363,164  11/1994  Kobayashi et al. ............... 354/195.1

FOREIGN PATENT DOCUMENTS 4-40210  4/1992  Japan.

Primary Examiner—Howard B. Blankenship
Attorney, Agent, or Firm—Finnegan, Henderson, Farabow, Garrett & Dunner

[57] ABSTRACT

A camera having an auto photographing mode conversion function and method including a switch block having a power switch, a first step release switch, a second step release switch, and a photographing mode conversion switch. The camera includes a zoom position detecting circuit, an automatic distance measuring circuit, and a brightness measuring circuit. A microcontroller receives corresponding signals from the automatic distance measuring circuit, the brightness measuring circuit, and the zoom position detecting circuit. The microcontroller compares a measured distance with respect to an object and a possible photographing distance in accordance with the zoom position of the lens groups, produces a signal to drive all the lens groups to a suitable photographing position in accordance with the measured distance, and carries out the photographing operation. The photographing operation is carried out using auto conversions between macro and normal photographing modes and without any mechanical operation. The lens system is designed to allow the lens operation states of the macro and normal photographing to be the same.

12 Claims, 3 Drawing Sheets

CAMERA WITH AUTO PHOTOGRAPHING MODE CONVERSION FUNCTION AND METHOD FOR CONTROLLING THE SAME

BACKGROUND OF THE INVENTION

1. Field of the Invention

The present invention relates generally to a camera system and method. More particularly, the present invention relates to a camera system having an auto photographing mode conversion function that automatically converts a normal photographing mode to a macro or close-up photographing mode in accordance with a measured distance from an object and a focal length.

2. Description of the Related Art

Conventionally, to take a photograph of a close object, a user selects a photographing mode in which a macro or close-up photography is possible through a photographing mode switch because the object can not be photographed clearly in a normal photographing mode. If the macro or close-up photographing mode is selected, a lens barrel is moved to the macro or close-up photographing position. From this, a close object can be photographed clearly.

However, the conventional camera has a disadvantage in that it is difficult to take a photograph of a transient image or at a moment's notice of a close object because the camera must be set to the close-up mode. In particular, the user must move the lens barrel to the macro photographing position by selecting the close-up photographing mode through the photographing mode switch prior to taking the transient, close-up image. The conventional camera has another disadvantage in that if the user does not realize that an object to be photographed is close and still takes a photograph of the close object in the normal photographing mode, a clear photograph cannot result.

A technique to overcome the above-mentioned disadvantages is described in Japanese Utility Model Publication No. Hei 4-40210, published on Apr. 6, 1992, "ZOOM LENS HAVING A MACRO PHOTOGRAPHING FUNCTION". However, this technique has limitations in the lens design because lens group movement in accordance with the macro photography is limited only to a part of the lens group, and the photographing distance from the object is limited to designing a high magnification zoom lens.

SUMMARY OF THE INVENTION

An object of the present invention is to provide a camera system having an auto photographing mode conversion function and method that overcomes the problems and disadvantages of the conventional devices.

To achieve this and other objects and in accordance with the purpose of the invention, as embodied and broadly described herein, a camera having an auto photographing mode conversion function includes a plurality of lens groups; means for detecting a position of the lens groups and for producing a first signal corresponding to the detected position; means for measuring a distance with respect to an object to be photographed and for producing a second signal corresponding to the measured distance; means for measuring an ambient brightness surrounding the object and for producing a third signal corresponding to the measured brightness; a microcontroller for comparing the measured distance and a predetermined photographing distance value in accordance with the detected position of the lens groups based on the first, second and third signals to produce a lens driving signal; and means for moving the lens groups to a suitable photographing position in response to the lens driving signal.

According to another aspect of the present invention, a method for controlling a camera having an auto photographing mode conversion function with a plurality of lens groups includes the steps of measuring a distance with respect to an object to be photographed; measuring an ambient brightness of the object; detecting a position of the lens groups; comparing the measured distance and a predetermined photographing distance value in accordance with the detected position of the lens groups; and moving the lens groups to a suitable photographing position based on the result of said comparison.

The objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the preferred embodiment of the invention, an example of which is illustrated in the accompanying drawings. Wherever possible, the same reference numbers will be used throughout the drawings to refer to the same or like parts.

Figure 1:
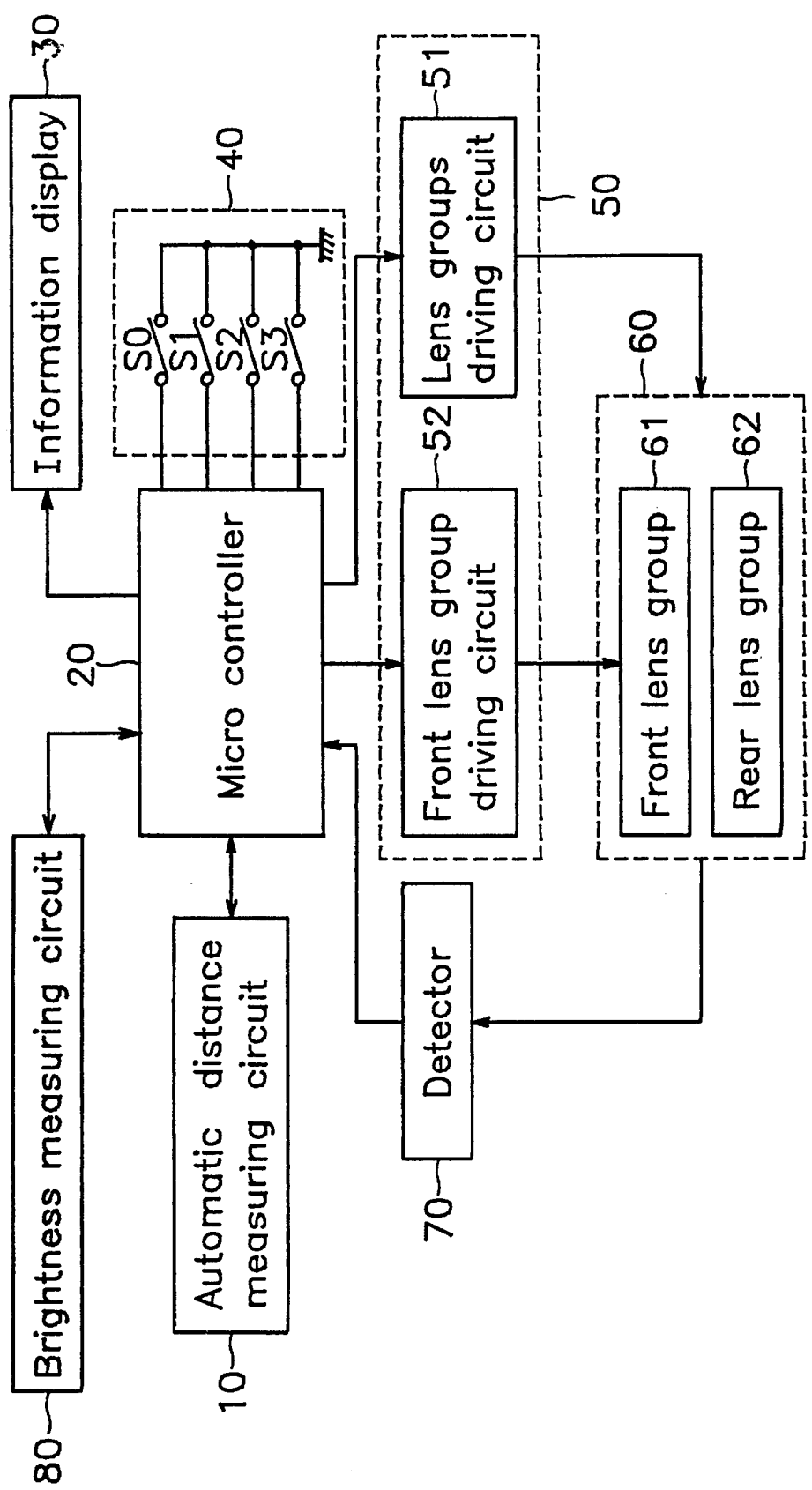
FIG. 1 is a block diagram of a camera having an auto photographing mode conversion function in accordance with an embodiment of the present invention.

FIG. 1 is a block diagram of a camera having an auto photographing mode conversion function in accordance with the preferred embodiment of the present invention. As shown in FIG. 1, the embodiment includes a switch block 40 having switches S0–S3 and a microcontroller 20 connected to output terminals of the switch block 40. In this embodiment, switch S0 is a power switch, switch S1 is a first step release switch, switch S2 is a second step release switch, and switch S3 is a photographing mode conversion switch.

The embodiment includes an automatic distance measuring circuit 10 connected to the microcontroller 20, a brightness measuring circuit 80, an information display 30, and a lens driving circuit 50. The lens driving circuit 50 includes a front lens group driving circuit 52 and a general lens group driving circuit 51. The embodiment includes lens groups 60 connected to the lens driving circuit 50 and having front lens groups 61 and rear lens groups 62, and a zoom position detector 70 connected to an output of the lens group 60.

Figure 2:
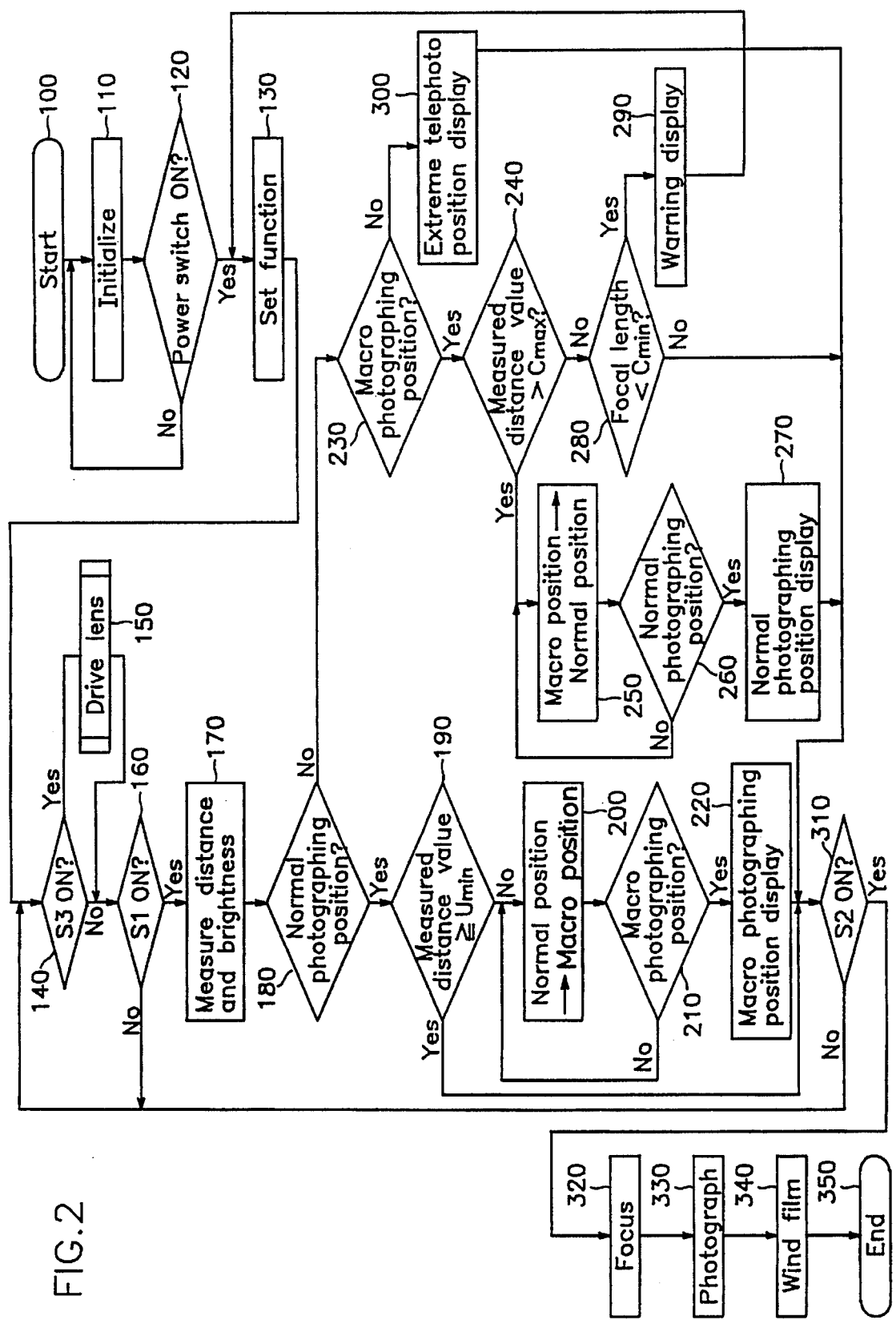
FIG. 2 is a flow chart of the successive steps in the method in accordance with the embodiment of the present invention.

FIG. 2 shows the operation of the camera of the embodiment of the present invention. When power is applied to the camera, the microcontroller 20 initializes internal circuits in the camera (Step 110), and determines whether the power switch S0 is activated (Step 120). If the power switch S0 is turned ON and after opening the lens cap, the microcontroller 20 sets the photographing function according to a corresponding input applied by a user from the switch block 40 (Step 130). If the power switch S0 is not turned ON, however, the camera is placed in a standby mode.

When the photographing function is set after the power switch S0 is turned ON (Step 130), the microcontroller 20 determines whether the photographing mode conversion switch S3 is turned ON (Step 140). The photographing mode conversion switch S3 converts a normal photographing mode to a macro photographing mode. If the mode conversion switch S3 is turned ON, the microcontroller 20 executes a lens driving subroutine to drive a zoom lens (Step 150). If the mode conversion switch S3 is not turned ON, however, the microcontroller 20 determines whether a first step release switch S1 is turned ON (Step 160).

Figure 3:
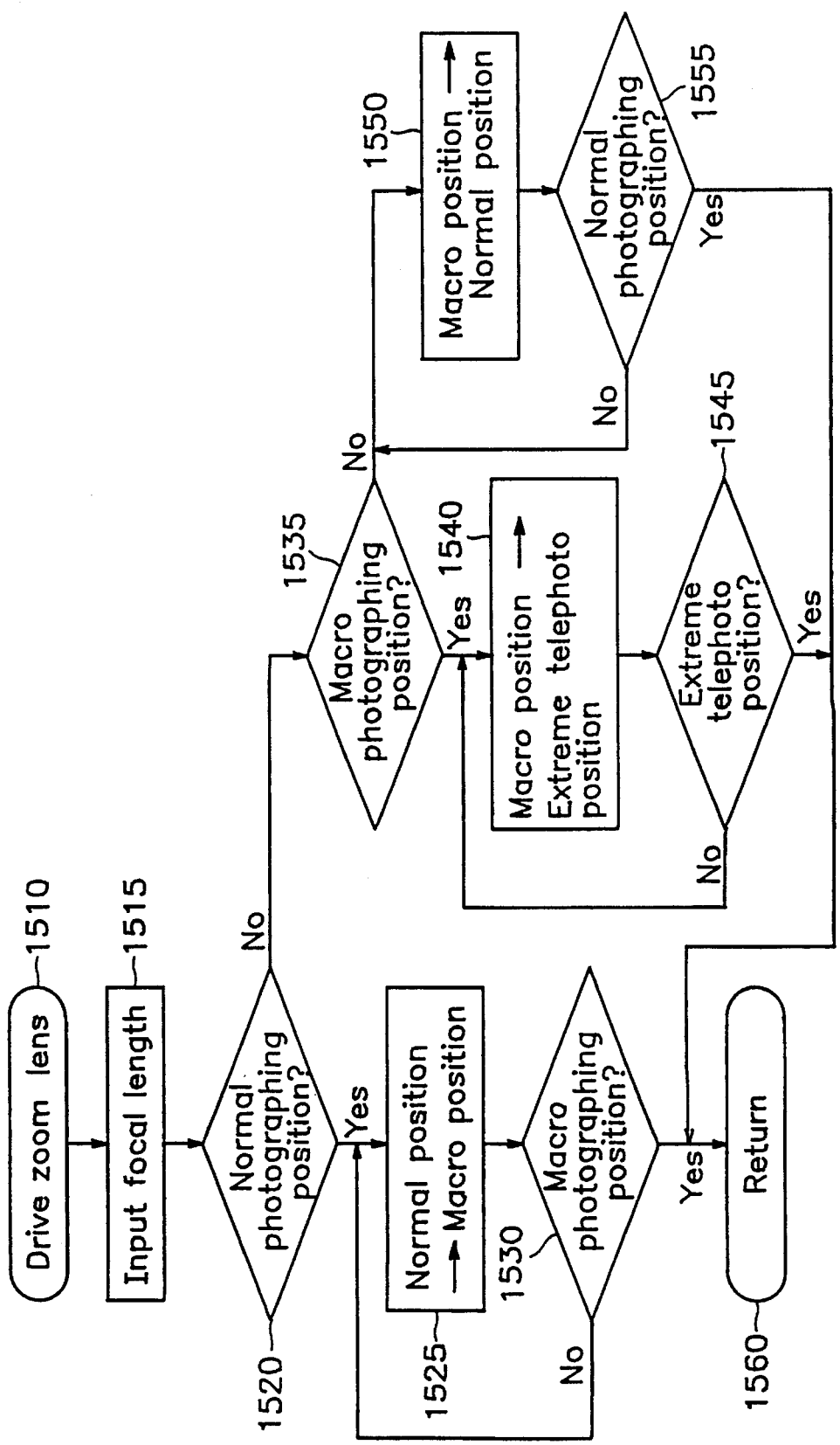
FIG. 3 is a flow chart of the lens driving routine in the method in accordance with the embodiment of the present invention.

If the mode conversion switch S3 is turned ON and the process branches to the lens driving routine (Step 150), the camera operates as shown in FIG. 3, which is a flow chart of a zoom lens driving routine. In FIG. 3, when the zoom lens driving routine (Step 1510) is started, the present zoom position of the lens group 60 is input to the microcontroller 20 through the zoom position detector 70. Once the microcontroller 20 receives the present zoom position of the lens group 60, the microcontroller 20 determines a corresponding focal length in accordance with the zoom position (Step 1515), and then determines whether the present position of the lens group 60 is a normal photographing position (Step 1520).

If the present position of the lens group 60 is in the normal photographing position, the microcontroller 20 activates the lens group driving circuit 51 to move the lens group 60, which includes the front lens group 61 and the rear lens group 62, to the macro photographing position (Step 1525). After moving the lens group 60 to the macro photographing position, the microcontroller 20 verifies the operation by determining the position of the moved lens group 60 through the zoom position detector 70 (Step 1530).

After the microcontroller 20 determines the position of the moved lens group 60, if the position of the lens group 60 is the macro photographing position, the microcontroller 20 returns to the main program or routine. However, if the position of the lens group 60 is not the macro photographing position, the microcontroller 20 continues to operate the lens group driving circuit 51 until the lens group 60 is moved to the macro photographing position.

If the position of the lens group 60 is not in the normal photographing position (Step 1520), the microcontroller 20 determines whether the present position of the lens group 60 is the macro photographing position (Step 1535). If the present position of the lens group 60 is the macro photographing position, the microcontroller 20 operates the lens group driving circuit 51 to move the lens group 60 to an extreme telephoto position (Step 1540). Subsequently, the microcontroller 20 verifies whether the present position of the lens group 60 is the extreme telephoto position (Step 1545), and once verified, the process returns to the main routine (Step 1560). However, if the present position of the lens group 60 is not the extreme telephoto position (Step 1545), the microcontroller 20 continues to operate the lens group driving circuit 51 until the lens group 60 is moved to the extreme telephoto position.

If the present position of the zoom lens group 60 is not in the macro photographing position (Step 1535), the microcontroller 20 operates the zoom lens driving circuit 51 to move the lens group 60 to the normal photographing position (Step 1550). After converting the lens group to the normal photographing position, the microcontroller 20 verifies whether the present position of the lens group is the normal photographing position (Step 1555). If the present position of the lens group is the normal photographing position, the process returns to the main routine (Step 1560).

When the process returns from the lens driving routine to continue in the main routine, the first step release switch S1 and the second step release switch S2 of the shutter are activated. Accordingly, the photographing operation are carried out. The details of this operation is explained as follows with reference to FIG. 2.

If the photographing mode conversion switch S3 is not activated in the main routine (Step 140), the microcontroller 20 determines whether the first step release switch S1 is turned ON (Step 160). If the first step release switch S1 is turned ON, the microcontroller 20 operates the automatic distance measuring circuit 10 and measures a distance with respect to the object to be photographed. The microcontroller 20 detects the present position of the lens group 60 through the zoom position detector 70, and measures an ambient brightness surrounding the object through the brightness measuring circuit 80 (Step 170).

The microcontroller 20 measures both the distance from the object and the ambient brightness surrounding the object, calculates the focal length in accordance with the detected zoom position of the lens group 60, and determines whether the present zoom position of the lens group 60 is the normal photographing position (Step 180). If the present zoom position of the lens group 60 is the normal photographing position, the microcontroller 20 compares a minimum possible photographing distance value, Umin, (at the normal photographing position in accordance with the calculated focal length) to the measured value of the distance with respect to the object (Step 190). If the measured distance value is less than the minimum possible photographing distance value, Umin, at which normal photography is possible, the user cannot take a clear photograph from the present position of the lens group 60. Hence, the microcontroller 20 operates the lens group driving circuit 51 to move the lens group 60 to the macro photographing position (Step 200).

After moving the lens group 60 to the macro photographing position, the microcontroller 20 detects the present position of the lens group 60 through the zoom position detector 70, and verifies whether the lens group 60 has moved to the macro photographing position (Step 210). If the lens group 60 has moved exactly to the macro photographing position, the microcontroller 20 indicates that the present position of the lens group 60 is the macro photographing position through the information display 30 (Step 220).

In Step 180, if the present position of the lens group 60 is not the normal photographing position, the microcontroller 20 determines whether the present zoom position of the lens group 60 is the macro photographing position (Step 230). If the present zoom position of the lens group 60 is the macro photographing position, the microcontroller 20 compares the measured distance value and a maximum possible photographing distance value, Cmax, in the macro photographing position (Step 240). If the measured value is greater than the maximum photographing distance value, Cmax, the microcontroller 20 operates the lens driving circuit 50 to move the lens group 60 to the normal photographing position (Step 250). When the microcontroller 20 verifies that the lens group 60 has moved exactly to the normal photographing position (Step 260), the microcontroller 20 indicates that the present position of the lens group 60 is the normal photographing position through the information display 30 (Step 270).

However, if the measured value is not greater than Cmax in the macro photographing position (Step 240), the microcontroller 20 determines whether the focal length is less than a minimum photographing distance value, Cmin (Step 280). If the focal length is less than the minimum possible photographing distance value, Cmin, in the macro photographing position, the microcontroller 20 displays a warning informing the user that a clear photograph is impossible (Step 290). The microcontroller 20 disables the shutter (not shown) and then returns the process to the initial standby mode. If the measured value (focal length) is not less than Cmin, however, the camera is placed in an intermediate standby mode and waits for the operation of the second step release switch S2 in the macro photographing position.

In Step 230, if the present zoom position of the lens group 60 is not in the macro photographing position, the microcontroller 20 indicates that the present zoom position of the lens group 60 is the extreme telephoto position through the information display 30 (Step 300). Then, the camera is placed in the intermediate standby mode and waits for the operation of the second step release switch S2 in the extreme telephoto position.

Once the above operations are carried out, the microcontroller 20 determines whether the second step release switch S2 is activated (Step 310). If the second step release switch S2 is turned ON, the microcontroller 20 operates the lens group driving circuit 51, moves all the lens groups 61, focuses on the object (Step 320), and takes the photograph (Step 330).

The microcontroller 20 moves the entire lens group 60 for the macro photographing position or the normal photographing position, so that the lens group 60 moves to each desired photographing position. Accordingly, it is possible to focus on the object in accordance with the photographing position without any additional mode conversions because the degree or amount of movement and the measured step number corresponding to each photograph position within the photograph range are the same when the focusing of the front lens group on the object is adjusted. Thus, the photographing process is carried out, a film of one cut is transferred, and the process is complete (Step 350).

As described above, the microcontroller 20 operates the entire lens group 60, and hence, moves the position of the lens group 60 to the macro photographing position or the normal photographing position in the embodiment in accordance with the invention. Accordingly, it is possible for the user to take photographs freely by making the amount of movement of the entire lens group 60 and the measured step number to be the same, irrespective of the macro photographing position or the normal photographing position at the time of focusing on the object.

The camera and method of the present invention having the auto photographing mode conversion function does not require the user to know the distance with respect to the object. Accordingly, the user can easily photograph a transient, spontaneous image. The lens group system can be designed easily and the photograph position is automatically converted without any mechanical operations.

It will be apparent to those skilled in the art that various modifications and variations can be made in the camera and method of the present invention without departing from the spirit or scope of the invention. Thus, it is intended that the present invention cover the modifications and variations of this invention provided they come within the scope of the appended claims and their equivalents.

What is claimed is:

1. A camera having an auto photographing mode conversion function, comprising:

a plurality of lens groups;

means for detecting a position of said lens groups and for producing a first signal corresponding to the detected position;

means for measuring a distance with respect to an object to be photographed and for producing a second signal corresponding to the measured distance;

means for measuring an ambient brightness surrounding the object and for producing a third signal corresponding to the measured brightness;

a microcontroller for comparing the measured distance and a predetermined photographing distance value in accordance with the detected position of the lens groups based on said first, second, and third signals to produce a lens driving signal; and means for moving said lens groups to a suitable photographing position in response to said lens driving signal, wherein said microcontroller includes:

means for determining whether the measured distance and the detected position of the lens groups correspond to a normal photographing position;

means for comparing the measured distance value with a predetermined minimum photographing distance value in accordance with the normal photographing position while the present position of the lens groups is in the normal photographing position; and means for generating a signal to the lens groups corresponding to a macro photographing position of the lens groups when the measured distance is less than or equal to the predetermined minimum photographing distance value while the present position of the lens groups is in the normal photographing position.

2. A camera having an auto photographing mode conversion function according to claim 1, further comprising means for informing a user of a detected operation state and function of the camera, and the detected position of the lens groups.

3. A camera having an auto photographing mode conversion function according to claim 1, wherein said microcontroller includes means for controlling a distance moved by the lens groups at every suitable photographing position in accordance with the distance with respect to the object, the distance corresponding to an auto focus step in accordance with the photographing position by moving all of the lens groups, whereby the camera focuses on the object without any additional position conversions.

4. A camera having an auto photographing mode conversion function according to claim 1, wherein said microcontroller includes means for generating a signal for displaying a position status corresponding to a present position of the lens groups.

5. A camera having an auto photographing mode conversion function according to claim 1, wherein said microcontroller includes:

means for comparing the measured distance value with a predetermined maximum photographing distance value in accordance with a macro photographing position while a present position of the lens groups is in the macro photographing position; and means for generating a signal to the lens groups corresponding to a normal photographing position of the lens groups when the measured distance is greater than the predetermined maximum photographing distance value while the present position of the lens groups is in the macro photographing position.

6. A camera having an auto photographing mode conversion function according to claim 5, wherein said microcontroller includes:

means for comparing a second measured value with a predetermined minimum photographing distance value when the measured distance is less than or equal to the predetermined maximum photographing distance value in accordance with the macro photographing position;

means for performing the photographing operation at the macro photographing position when the second measured value is greater than or equal to the predetermined minimum photographing distance value; and means for generating a signal for stopping a shutter operation when the second measured value is less than the predetermined minimum photographing distance value.

7. A method for controlling a camera having an auto photographing mode conversion function with a plurality of lens groups, comprising the steps of:

measuring a distance with respect to an object to be photographed;

measuring an ambient brightness of the object;

detecting a position of said lens groups;

comparing the measured distance and a predetermined photographing distance value in accordance with the detected position of the lens groups; and moving the lens groups to a suitable photographing position based on the result of said comparison, wherein the moving step includes the substeps of:

determining whether the measured distance and the detected position of the lens group correspond to a normal photographing position;

comparing a predetermined minimum photographing distance value in accordance with the normal photographing position and the measured distance while a present position of the lens groups is in the normal photographing position; and moving the lens groups to a position corresponding to a macro photographing position when the measured distance is smaller than the predetermined minimum photographing distance value.

8. A method for controlling a camera according to claim 7, further comprising the step of displaying a present position of the lens groups to indicate a macro photographing position during the step of moving the lens groups to the macro photographing position.

9. A method for controlling a camera according to claim 7, wherein said moving step includes the substeps of:

determining whether a present position of the lens groups corresponds to a macro photographing position;

comparing the measured distance and a predetermined maximum photographing distance value when the present position of the lens groups corresponds to the macro photographing position; and moving the lens groups to a position corresponding to a normal photographing position when the measured distance is greater than the predetermined maximum photographing distance value.

10. A method for controlling a camera according to claim 7, wherein the moving step includes the substep of displaying a present position of the lens groups as corresponding to an extreme telephoto photographing mode when the present position of the lens groups is neither a macro photographing position nor a normal photographing position.

11. A method for controlling a camera according to claim 9, wherein said moving step further includes the substeps of:

comparing a second measured value and a predetermined minimum photographing distance value when the measured distance is less than or equal to the predetermined maximum photographing distance value;

carrying out the photographing operations in the macro photographing position when the measured distance is greater than or equal to the predetermined minimum photographing distance value; and stopping a shutter operation when the measured distance is less than the predetermined minimum photographing distance value.

12. A method for controlling a camera according to claim 11, further comprising the step of displaying a warning that the photographing operation is not possible after stopping the shutter operation.

* * * * *